United States Patent
Tamamura

(10) Patent No.: US 7,161,628 B2
(45) Date of Patent: Jan. 9, 2007

(54) IMAGE-PICKUP APPARATUS OUTPUTTING SIGNALS FOR FINDER DISPLAY AND SIGNALS FOR FOCAL-POINT DETECTION, CONTROL METHOD APPLIED TO THE APPARATUS, AND COMPUTER READABLE MEDIUM HAVING ENCODED THEREON A PROGRAM IMPLEMENTING A METHOD USING THE APPARATUS

(75) Inventor: Hideo Tamamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 10/320,477

(22) Filed: Dec. 17, 2002

(65) Prior Publication Data

US 2003/0117508 A1    Jun. 26, 2003

(30) Foreign Application Priority Data

Dec. 25, 2001   (JP)   ............................. 2001-392639

(51) Int. Cl.
*G03B 13/00*   (2006.01)
*H04N 5/232*   (2006.01)

(52) U.S. Cl. ................................. 348/345; 348/333.11

(58) Field of Classification Search .......... 348/333.01, 348/345, 333.11, 346–352
See application file for complete search history.

(56) References Cited

U.S. PATENT DOCUMENTS

| 5,604,561 A | * | 2/1997 | Ozawa et al. | ................ 396/96 |
|---|---|---|---|---|
| 5,664,243 A | | 9/1997 | Okada et al. | ................ 396/246 |
| 5,953,546 A | | 9/1999 | Okada et al. | ................ 396/272 |
| 6,477,327 B1 | | 11/2002 | Imai | ............................ 396/89 |
| 7,009,641 B1 | * | 3/2006 | Takahashi | ................ 348/223.1 |
| 2002/0008765 A1 | * | 1/2002 | Ejima et al. | ................ 348/239 |
| 2004/0207747 A1 | * | 10/2004 | Ikeda | ......................... 348/335 |

FOREIGN PATENT DOCUMENTS

| JP | 7-143388 | 6/1995 |
|---|---|---|
| JP | 9-43506 | 2/1997 |
| JP | 2000-305010 | 11/2000 |
| JP | 2000-321488 | 11/2000 |
| JP | 2001-264624 | 9/2001 |

* cited by examiner

*Primary Examiner*—Vivek Srivastava
*Assistant Examiner*—Gevell Selby
(74) *Attorney, Agent, or Firm*—Fitzpatrick, Cella, Harper & Scinto

(57) ABSTRACT

An image-pickup apparatus, a control method applied to the image-pickup apparatus, and a control program for operating a computer used for the image-pickup apparatus are provided. The image-pickup apparatus comprises an image-pickup element for picking up the images of a subject. The image-pickup element can output image signals for performing finder display and focal-point detection. The image-pickup apparatus further comprises a control device for performing first-image pickup a predetermined number of times for performing the finder display and for performing second-image pickup for performing the focal-point detection every time the first-image pickup is performed the predetermined number of times.

9 Claims, 6 Drawing Sheets

IMAGE-PICKUP APPARATUS OUTPUTTING SIGNALS FOR FINDER DISPLAY AND SIGNALS FOR FOCAL-POINT DETECTION, CONTROL METHOD APPLIED TO THE APPARATUS, AND COMPUTER READABLE MEDIUM HAVING ENCODED THEREON A PROGRAM IMPLEMENTING A METHOD USING THE APPARATUS

BACKGROUND OF THE INVENTION

1. Field of the Invention

The present invention relates to an image-pickup apparatus that performs focal-point detection by using an image-pickup element that performs image pickup for performing finder display. Further, the present invention relates to a control method applied to the image-pickup apparatus and to a control program for operating a computer used for the image-pickup apparatus.

2. Description of the Related Art

The art of using images picked up by a CCD video camera as AF images for performing mountain-climbing AF and as EVF images to be displayed on an electronic viewfinder (an EVF) is disclosed in Japanese Patent Laid-Open No. 7-143388.

The art of splitting part of an image-pickup element of a digital camera in two for performing phase-difference AF (autofocus) is disclosed in Japanese Patent Laid-Open No. 2000-305010. In such a case, it becomes possible to calculate the direction of a subject (the driving direction of a lens) and the moving amount of the lens more appropriately than in the case where the mountain-climbing AF is performed.

However, the above-described arts have the following problems.

In the case where the mountain-climbing AF as in Japanese Patent Laid-Open No. 7-143388 is performed, the contrast peak of subject images is searched by moving the lens. Therefore, it becomes necessary to perform AF calculation for each field by using image data. Subsequently, the AF speed is decreased.

Further, according to the art disclosed in Japanese Patent Laid-Open No. 2000-305010, the phase-difference AF is performed. Therefore, it becomes possible to calculate the subject direction and the defocusing amount by using an output image data obtained by using only one image pickup. However, the output image data is obtained by using only part of pixels of the image pickup element. Therefore, the obtained image cannot be used as an EVF image. In such a case, an optical finder, which requires expensive parts, such as a mirror, a prism, and so forth, and ample space, is used.

Accordingly, the object of the present invention is to provide an image-pickup apparatus that can perform high-speed autofocusing (AF) by using an electronic viewfinder (EVF), an image-pickup method, a control program, and a recording medium.

SUMMARY OF THE INVENTION

It is an object of the present invention to perform focal-point detection without deteriorating finder display performed by using images captured by image pickup by using an image-pickup apparatus that performs the focal-point detection by using an image-pickup element that performs the image pickup for performing the finder display, a control method applied to the image-pickup apparatus, and a control program for operating a computer used for the image-pickup apparatus.

For achieving the above-described object, according to one aspect of the present invention, an image-pickup apparatus, a control method applied to the image-pickup apparatus, and a control program for operating a computer used for the image-pickup apparatus are provided. The image-pickup apparatus performs second-image pickup for performing focal-point detection every time it performs first-image pickup a predetermined number of times by using an image-pickup element for picking up the images of a subject and for outputting image signals for performing finder display and focal-point detection.

Other aspects of the present invention will be described in preferred embodiments shown below.

Further objects, features and advantages of the present invention will become apparent from the following description of the preferred embodiments (with reference to the attached drawings).

DESCRIPTION OF THE PREFERRED EMBODIMENTS

Preferred embodiments of the present invention will now be described with reference to attached drawings. An AF system according to a first embodiment of the present invention comprises an image-pickup element. On part of the image-pickup element, micro lenses for pupil-splitting the luminous flux that passes through a photographic lens and light receiving elements for receiving the pupil-split luminous flux are formed so that the micro lenses and the light receiving elements are paired with each other. Subsequently, a focus-detection area is formed on part of the image-pickup element for performing focus detection in a phase-difference detection mode. As described above, the light receiving elements, which are paired with the micro lenses, are not provided on the entire surface of the image-pickup element, but are provided only on part thereof. Such a configuration of the image-pickup element according to the first embodiment is the same as that of an image-pickup element disclosed in Japanese Patent Laid-Open No. 2000-305010. Therefore, the configuration and operating principles of the image-pickup element according to the first embodiment will not be described.

According to this embodiment, an image output from the image-pickup element can be viewed through an electronic view finder (an EVF), not through an optical finder. Further, since the AF speed is decreased by using a mountain-climbing AF system, a phase-difference AF system is used. That is to say, when a plurality of images is captured, only one image is captured as an AF image. All the other images are used as EVF images.

Since the AF image cannot be displayed as an EVF image, the EVF image just before the AF image must be displayed a longer period of time up until the point where the AF image would have been displayed if it had been captured as an EVF image. Accordingly, the EVF images are displayed without interruption.

Further, according to the first embodiment, the frequency of capturing AF images is changed according to the picture-taking mode. For example, when shooting a subject image that hardly moves, as in the case of portrait mode, there is no need to frequently capture images for AF. However, when shooting a subject image that moves quite often, as in the case of sports mode, it is necessary to capture images for AF as often as possible for following the subject.

Figure 1:
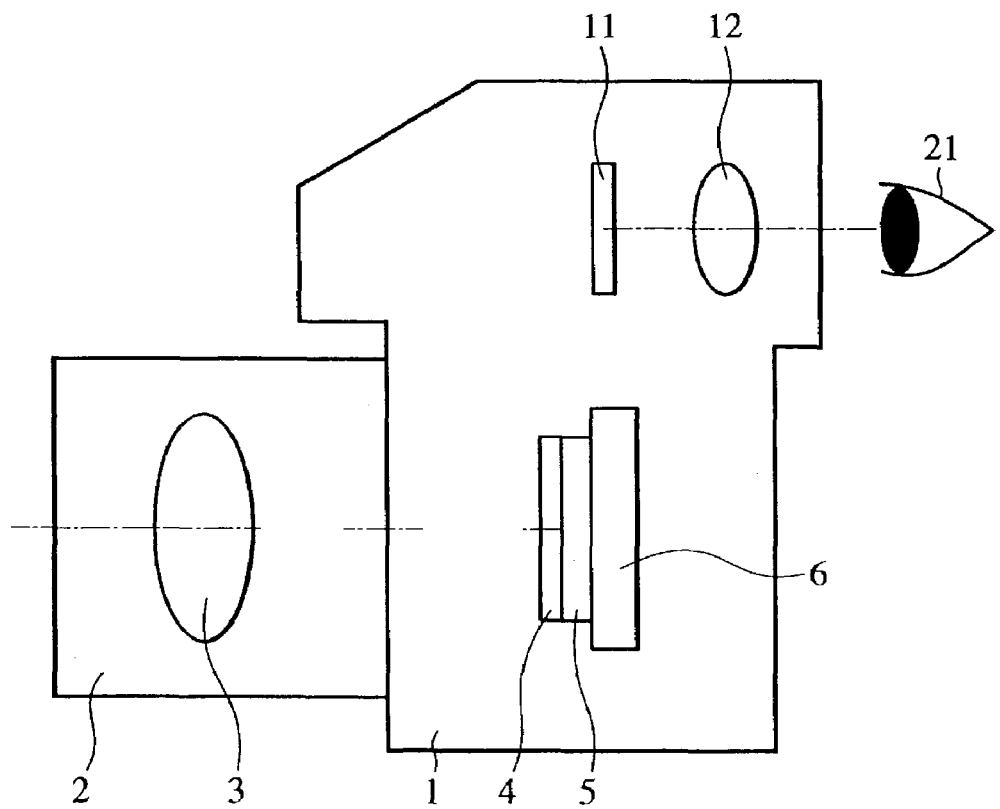
FIG. 1 is a sectional view of a digital according to an embodiment of the present invention.

FIGS. 1 to 4 illustrate a digital camera formed as an image-pickup unit according to the first embodiment of the present invention. In FIG. 1, reference numeral 1 indicates the main body of the digital camera, reference numeral 2 indicates a lens barrel, reference numeral 3 indicates a photographic optical system, reference numeral 4 indicates an infrared-cutting filter, reference numeral 5 indicates a low-pass filter, reference numeral 6 indicates an image-pickup unit, reference numeral 11 indicates a liquid-crystal display, reference numeral 12 indicates an eyepiece optical system, and reference numeral 21 indicates an eye of the user.

The configuration of the electronic view finder (the EVF) is described below. The infrared-cutting filter 4 eliminates infrared light from the luminous flux of the subject image passing through the photographic optical system 3. The low-pass filter 5 eliminates moiré fringes in the luminous flux. Then, the image-pickup unit 6 picks up the subject image. The image picked up by the image-pickup unit 6 is displayed by the liquid-crystal display 11 and is seen by the user (the eye 21) via the eyepiece optical system 12.

Figure 2:
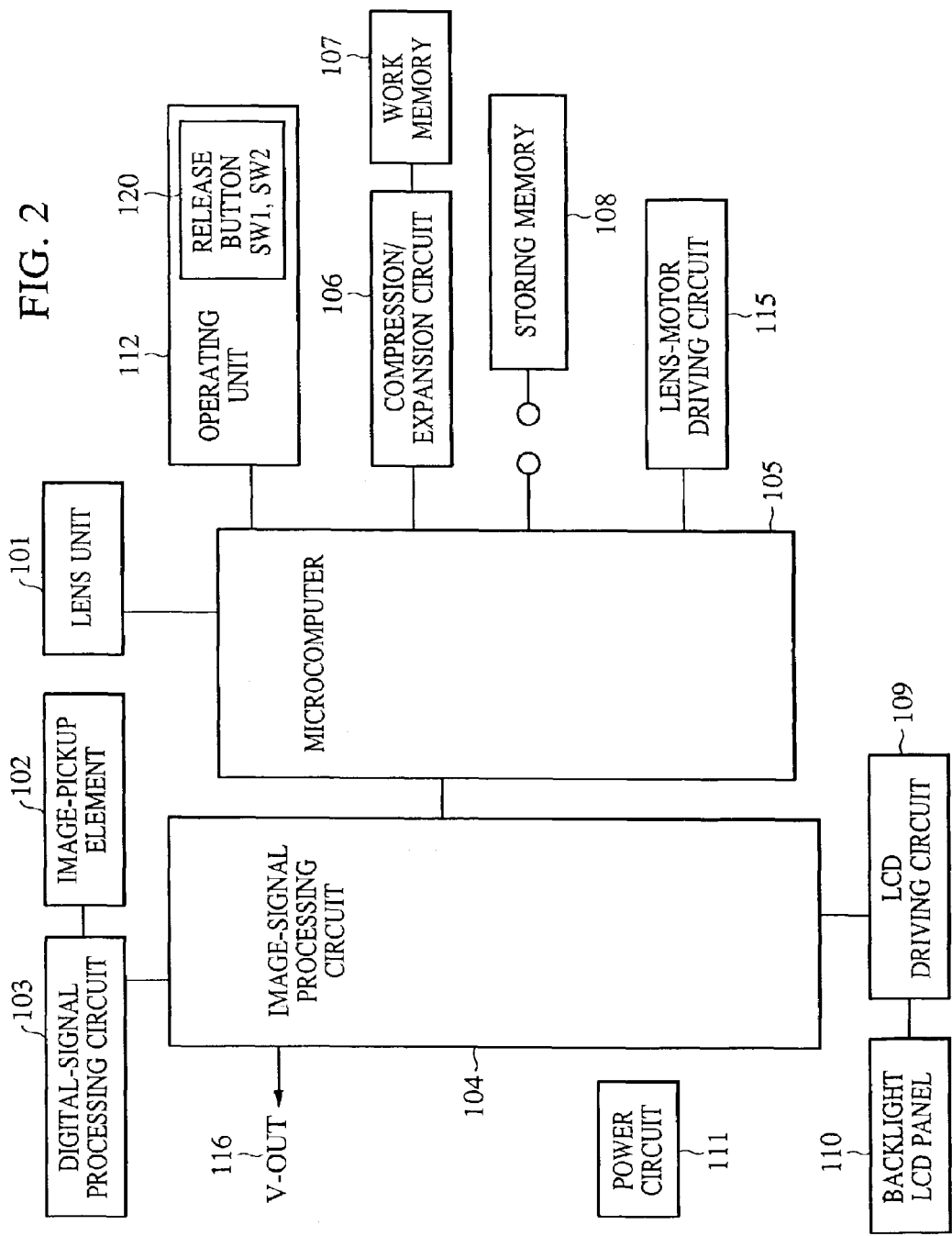
FIG. 2 is a block diagram illustrating circuits of the digital camera shown in FIG. 1.

FIG. 2 is a block diagram illustrating the circuits of the digital camera shown in FIG. 1. This drawing illustrates a lens unit 101 for capturing the subject image, a CCD 102 serving as the image-pickup unit, a digital-signal processing circuit 103 for processing captured image signals, and an image-signal processing unit 104. Further, the drawing illustrates a microcomputer 105 for controlling operation timing, an operating unit 112 for performing shutter releasing and photographing-mode switching. Signals transmitted from the operating unit 112 are read by the microcomputer 105. Further, the drawing illustrates a compression circuit 106, a work memory 107 used when the compression circuit 106 compresses data, a memory 108 formed of a nonvolatile flash memory or the like, a driving circuit 109 for the liquid-crystal display (LCD) 11, and a backlight 110. The driving circuit 109 drives the backlight 110 and a liquid-crystal panel of the liquid-crystal display 11. The driving circuit 109 also serves as a finder for displaying an image. Further, the drawing illustrates a power circuit 111 serving as a power source for supplying power to the units and elements of the digital camera. Further, the drawing illustrates a driving circuit 115 for moving the lens unit 101, a video out-terminal 116, and a release button 120. When image data is captured in synchronization with the release button 120, the compression circuit 106 compresses the image data and stores the compressed image data in the memory 108.

A brief description of image pickup performed by an image-pickup unit and the details of image pickup for AF disclosed in Japanese Patent Laid-Open No. 2000-305010 will be given below.

In the above-described case, a focus-detection area is formed by providing microlenses for pupil-splitting the luminous flux passing through a photographing lens and light receiving elements for receiving the pupil-split luminous flux on part of an image-pickup element. The microlenses and the light receiving elements are paired with each other. Focus detection in a phase-difference detection mode is performed in the focus-detection area. Since an image corresponding to the focus-detection area cannot be used, the following configuration is necessary. First light-receiving elements are provided by aligning a first plurality of light-receiving elements for receiving the light of a subject image passing through a photographing lens. Microlenses are provided for pupil-splitting luminous flux of the subject image. Second light-receiving elements are provided by aligning a second plurality of light-receiving elements for receiving the pupil-split luminous flux. The second light-receiving elements are paired with the microlenses. Focus-detection means is provided for performing focus detection based on the output from the second light-receiving elements. Correction means is provided for correcting the subject image corresponding to the focus-detection area on which the second light-receiving elements exist based on the output from the first light-receiving elements. Image-pickup means is provided for picking up the subject image based on the output from the first light-receiving elements and the output from the correction means.

Figure 3:
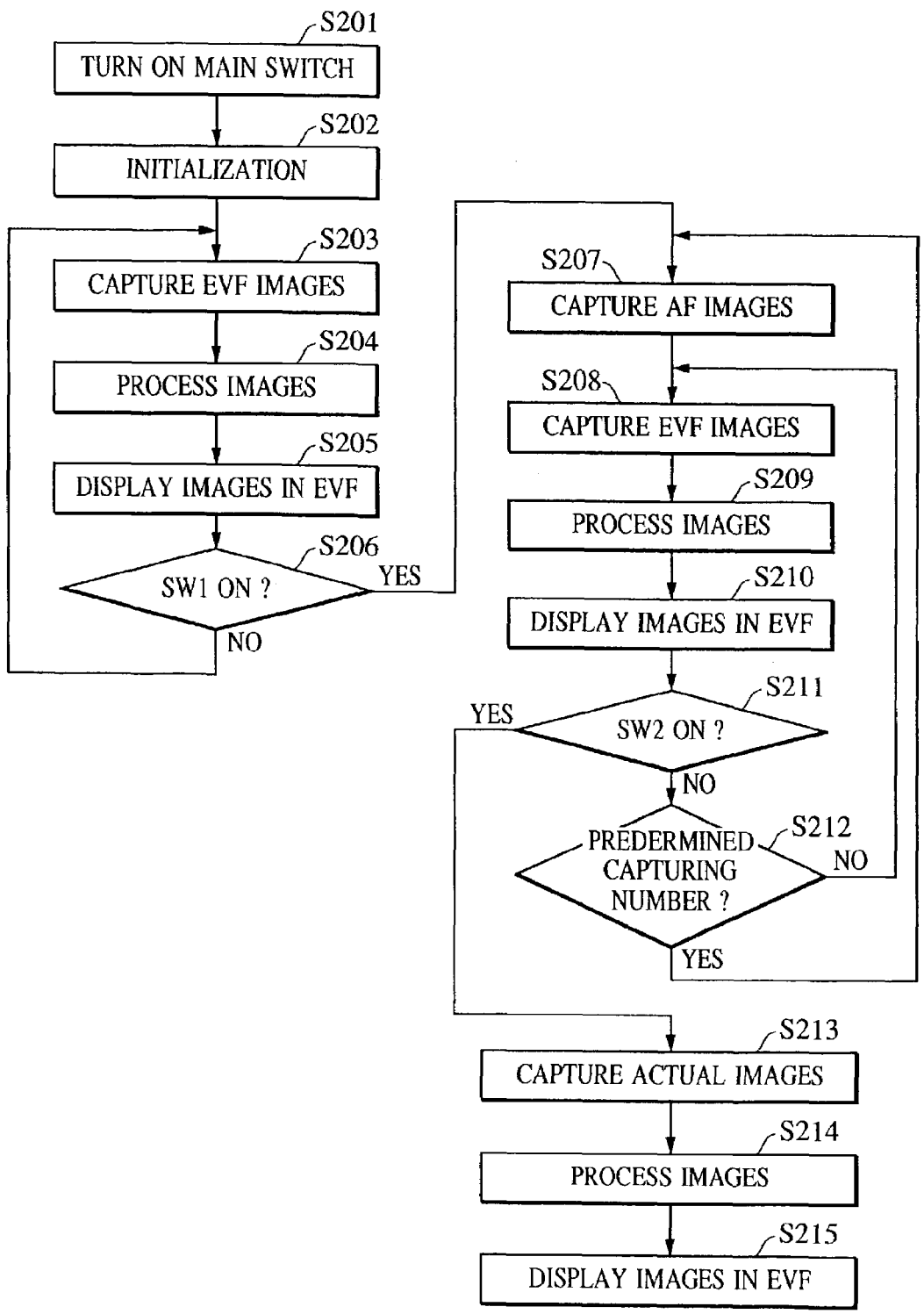
FIG. 3 is a flowchart illustrating operation performed according to the embodiment of the present invention.

FIG. 3 is a flowchart illustrating the operation performed for capturing EVF images and AF images.

At step S201, a main switch is turned on. At step S202, each block of the digital camera is initialized for displaying the subject image on the EVF serving as the finder.

At step S203, the subject image is captured by the image-pickup unit 6. At step S204, the captured subject image is processed. At step S205, the processed subject image is displayed on the EVF. Subsequently, the user can view the image displayed on the EVF serving as the finder.

At step S206, it is determined whether or not the switch SW1 is turned on. Then, the procedure goes back to step S203. By repeating such an operation, the subject image is continuously displayed on the EVF. The release button 120 has switches SW1 and SW2. The switch SW1 is turned on by half-pressing the release button 120. The switch SW2 is turned on by fully-pressing the release button 120. If the switch SW1 is turned on at step S206, the procedure advances to step S207. At step S207, the AF images are captured. The AF images are captured in the same way as in the case of Japanese Patent Laid-Open No. 2000-305010. As disclosed in Japanese Patent Laid-Open No. 2000-305010, AF images to be captured are images picked up by an AF-pixel unit (not shown).

At step S208, the EVF images are captured. Then, the captured EVF images are processed at step S209. At step S210, the processed EVF images are displayed on the EVF. The AF images captured at step S207 cannot be displayed on the EVF since they are partial images and can be used only for AF.

At step S211, it is determined whether or not the switch SW2 is turned on. At step S212, the number of captured EVF images is determined. If the switch SW2 is turned off, and the number of captured EVF images is less than a predetermined number, the procedure goes back to capture the EVF images and the subject image is continuously displayed on the EVF while the switch SW1 is in the ON state. During such a state, phase-difference AF calculation is performed based on data of the captured AF images. The lens unit 101 is driven toward the focal point based on the calculation result.

If the number of captured EVF images reaches the predetermined value at step S212, the procedure goes back to step S207 for capturing the AF images again for confirming the AF images while the lens unit 101 is being driven. However, in contrast to a case where the mountain-climbing AF system is used, there is no need to frequently repeat the phase-difference AF calculation because the widely known phase-difference AF system is used in this embodiment.

If the switch SW2 is turned on at step S211, the procedure advances to step S213. At step S213, the subject images are captured by the image-pickup unit 6. That is to say, photographing is performed. Then, at step S214, the images are processed. At step S215, the captured images are displayed on the EVF. The images processed at step S214 are stored in the memory 108 shown in FIG. 2.

The flow of operation from the step of capturing the EVF images (step S203), via the step of processing the captured EVF images (step S204), to the step of displaying the EVF images (step S205) will be described. Further, the operation performed at step S207 for capturing the AF images and the operation performed at step S208 for capturing the EVF images will be described.

Figure 4:
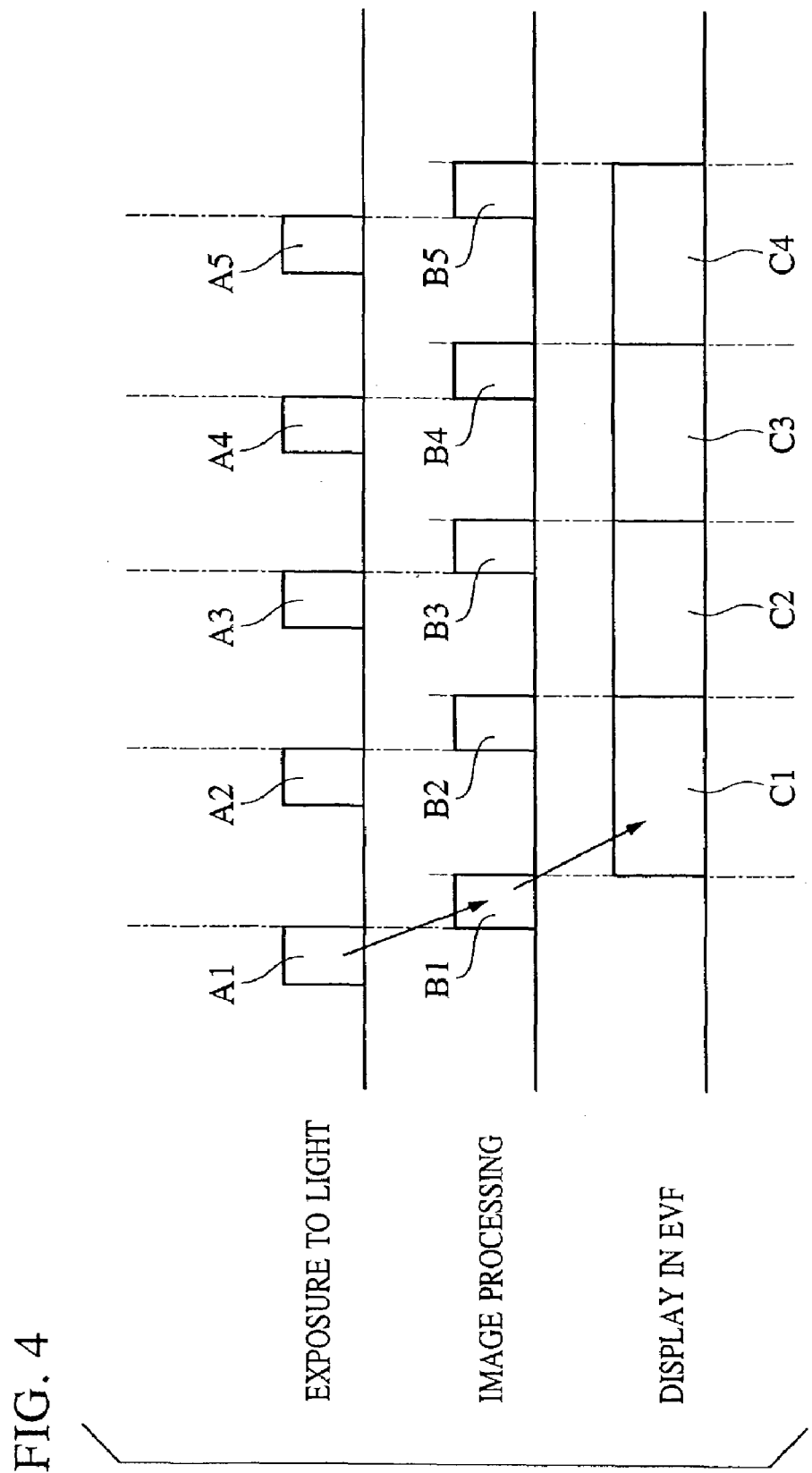
FIG. 4 is a timing chart illustrating operation timing according to the embodiment of the present invention.

FIG. 4 illustrates the case where images are picked up to be displayed on the EVF. In this case, no image is used as an AF image.

A first image pickup performed by the image-pickup element 6 is indicated by A1. A second image pickup is indicated by A2. A third image pickup is indicated by A3. The following image pick up is also indicated in a like manner as shown in the drawing. A first processing of the picked up image is indicated by B1 and a second processing of the picked up image is indicated by B2. The following processing is also indicated in a like manner as shown in the drawing. A first display of the image on the EVF is indicated by C1, and a second display is indicated by C2. The following display is also indicated in a like manner as shown in the drawing. The horizontal axis indicates the time. An image exposed to light as long as a time indicated by the A1 width is processed at B1. When the processing is done, the image is transmitted to the EVF and is displayed on a display such as the liquid-crystal display 11 as long as a time indicated by the C1 width. Then, the image is viewed by the user's eye, for example, the eye 21. For avoiding black out, the EVF images are continuously displayed as shown by C1, C2, C3, and C4 in FIG. 4.

The steps flow in the order of A1, B1, and C1, A2, B2, and C2, A3, B3, and C3, and so forth.

Figure 5:
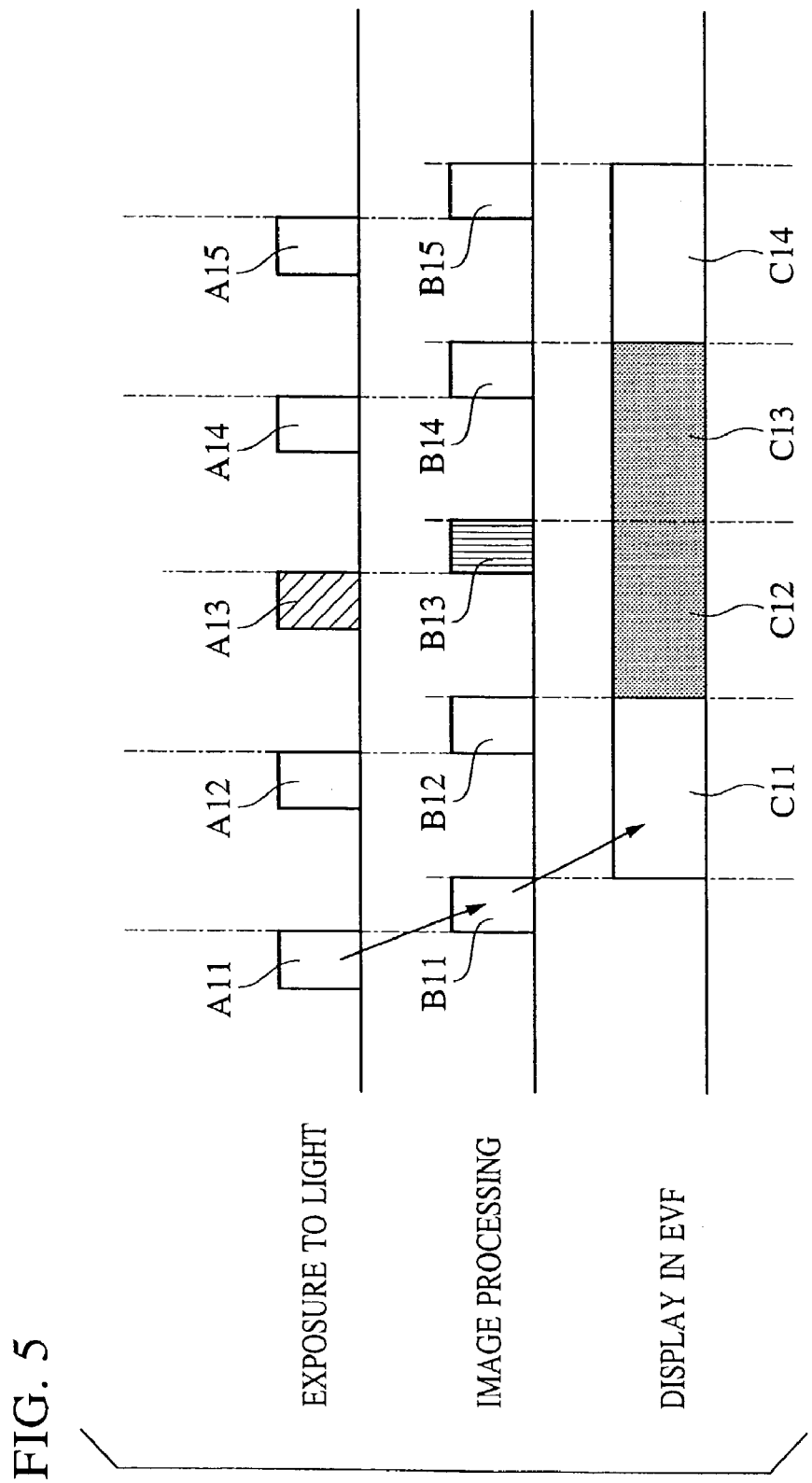
FIG. 5 is another timing chart illustrating operation timing according to the embodiment of the present invention.

FIG. 5 illustrates the case where the AF images are picked up while the EVF images are picked up. The image picked up at A11 is processed at B11 and is displayed on the EVF at C11. The image picked up at A12 is processed at B12 and is displayed on the EVF at C12. The image picked up at A13 is used as the AF image. The AF image is processed at B13 and is transmitted to an AF calculation unit (not shown). The AF image is not displayed on the EVF. Subsequently, at C13, there is no image to be displayed on the EVF. That is to say, a blackout period is formed, which is a cause of user discomfort. For staying out of such a trouble, according to this embodiment, the same EVF image as that displayed at C12 is diplayed at C13 for eliminating the blackout period. The image being displayed on the EVF is renewed at A14. An image picked up to be used as the EVF image is processed at B14 and is displayed on the EVF at C14.

Figure 6:
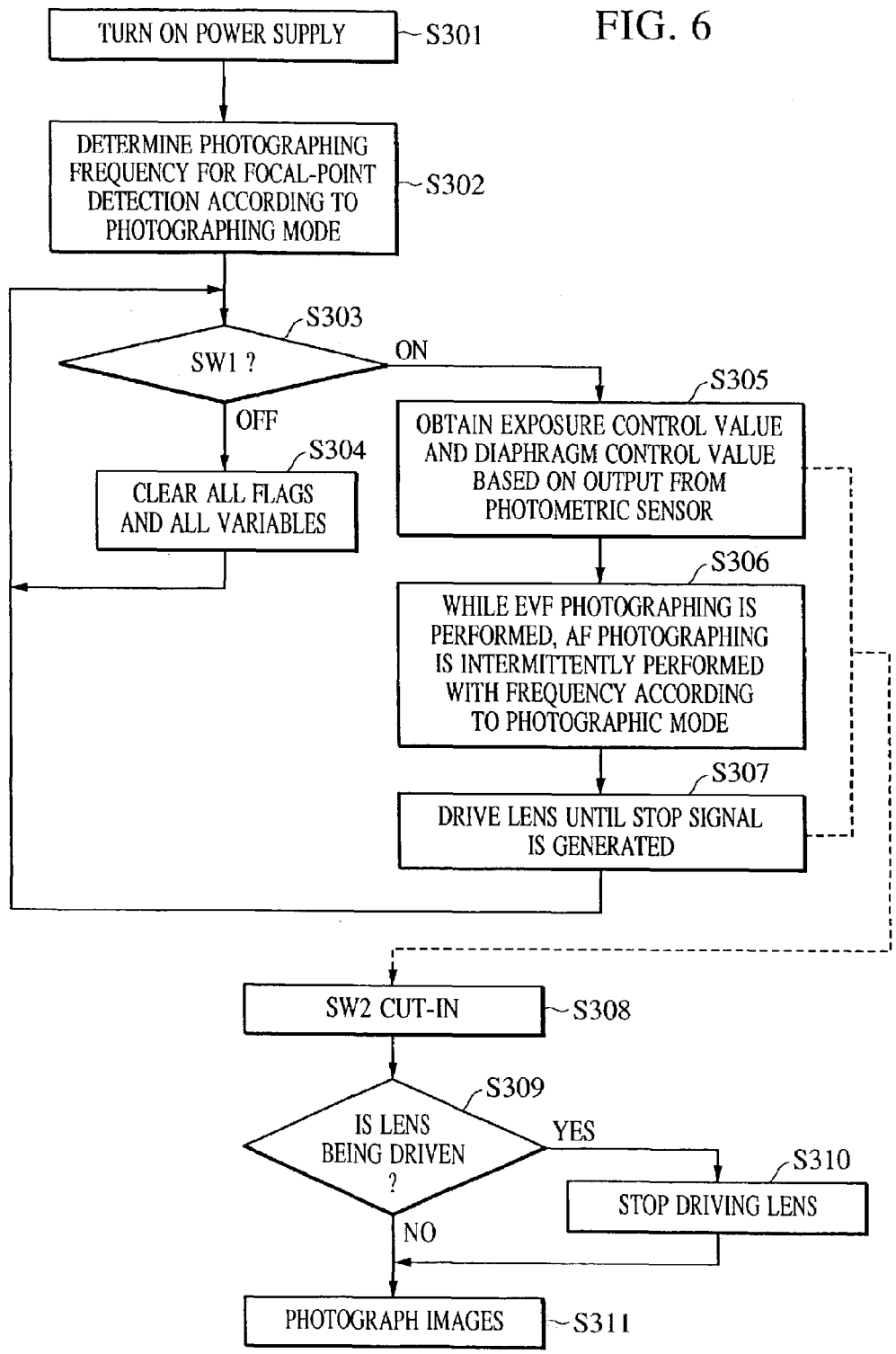
FIG. 6 is another flowchart illustrating operation performed according to the embodiment of the present invention.

FIG. 6 illustrates the operation performed when the switch SW1 and the switch SW2 are turned on.

For performing photographing by the digital camera, the power ciruit 111 is turned on at step S301. The photographing mode is set at step S302. Subsequently, the AF photographing frequency is determined for detecting the focal point.

When the switch SW1 is turned on at step S303, the release button 120 is half-pressed. If the switch SW1 is turned off at step S303, the procedure advances to step S304 for clearing and initializing control flags and control variables set in a RAM of the microcomputer 105. The operations performed at step S303 and S304 are repeated until the switch SW1 is turned on or the power circuit 111 is turned off. When the switch SW1 is turned on, the procedure advances from step S303 to step S305.

At step S305, a "photometric" subroutine is performed for controlling exposure. The microcomputer 105 obtains the most appropriate exposure control value and the most appropriate diaphragm control value based on an output from a photometric sensor (not shown) or the like. At the release operation time, the microcomputer 105 performs shutter control and diaphragm control. Then, at step S306, a "focusing" subroutine is performed. The microcomputer 105 performs calculation based on the image signal transmitted from the image-pickup element 6 and drives the photographic optical system 3 or the lens unit 101.

The AF photographing frequency used by the image-pickup element 102 is changed according to the photographic mode. For example, the lens unit 101 may be driven to a predetermined position and may be stopped there after only one AF photographing is performed. In another case, AF photographing may be performed several times before determining the lens position.

For example, in the case where the portrait mode is used, the lens position can be determined based on the calculation result obtained by a first-captured image. This is because the subject scarcely moves in such a case. However, if the subject moves a lot, for example, as in the case of a sports event, it is preferable to perform photographing in sports mode where the AF photographing is performed several times during the EVF photographing. By performing the AF photographing, it becomes possible to determine whether or not the subject moves for appropriately performing correction. Subsequently, the position where the lens unit 101 should be stopped is correctly determined according to the position of the subject.

Thus, it is preferable to change the AF photographing frequency according to the photographing mode.

After driving the lens unit 101, the procedure goes back to step S303. Then, the operations performed at step S305, step S306, and step S307 are repeatedly performed until the switch SW1 is turned off, or until the switch SW2 is turned on by fully pressing the release button 120. In this manner, the focal point of the subject is adjusted. When the release button 120 is fully pressed and the switch SW2 is turned on, the cut-in function is performed. Subsequently, the procedure moves to step S308 where the release operation is performed. At step S309, it is determined whether or not the lens unit 101 is being driven. If the lens unit 101 is being driven, the procedure advances to step S310 and a lens-driving stop command is generated. Subsequently, the lens unit 101 is stopped and the procedure advances to step S311. If the lens unit 101 is not driven at step S309, the procedure directly advances from step S309 to step S311. At step S311, photographing is performed for a predetermined time.

Thus, according to the embodiment, the images picked up by the image-pickup element 6 is viewed on the EVF. Then, while capturing the EVF images, the AF images are also captured for performing the phase-difference AF. Subsequently, it becomes possible to perform AF as fast as in the case where AF is performed by using an optical finder. Further, according to the embodiment, it becomes possible to perform AF faster than in the case where the widely known mountain-climbing AF is performed.

Further, by displaying the EVF image that was captured just before the AF image was captured a longer period of time up until the point where the AF image would have been displayed, the EVF display can be performed without interruption.

Further, by changing the frequency of picking up the AF images, it becomes possible to perform the most appropriate AF for the subject according to the photographic mode and to perform the EVF display without interruption.

The object of the embodiment can be achieved by providing a recording medium storing the program code of software that achieves the above-described functions to the system or the device. Then, a computer (or a CPU or an MPU) included in the system or the device may read the program code and may execute it for achieving the object of the present invention. In such a case, the program code that is read from the recording medium achieves the new functions of the present invention. Therefore, in such a case, the recording medium storing the program code serves as the component of the present invention. As has been described, the above-described functions can be achieved by executing the program code read by the computer. However, an OS operated on the computer based on the instructions of the program code may perform part of the procedures or all the procedures for achieving the functions of the present invention.

Further, when the program code read from the recording medium is stored in an expansion board provided in the computer or in a memory provided in an expansion unit connected to the computer, a CPU in the expansion board or the expansion unit may perform part of the procedures or all the procedures for achieving the functions of the present invention.

When the present invention is applied to the above-described recording medium, the recording medium stores the program code corresponding to the flowcharts shown in FIGS. 3 and 6.

Further, part of the components or the entire components, which are described in Claims or the embodiments of the present invention, may form one device. Otherwise, part of the components or the entire components may be connected to other apparatus or may be components of the other apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-pickup apparatus comprising:
an image-pickup element configured to pick up images of a subject and to output first-image signals usable for performing finder display and second-image signals usable for performing focal-point detection; and
a control device configured to perform a first-image pickup operation a predetermined number of times, configured to perform the finder display, and configured to perform a second-image pickup operation for performing the focal-point detection every time the first-image pickup operation is performed the predetermined number of times,
wherein said control device does not perform the finder display using the second-image signal generated by the second-image pickup operation.

2. An image-pickup apparatus comprising:
an image-pickup element configured to pick up images of a subject and to output first-image signals usable for performing finder display and second-image signals usable for performing focal-point detection; and
a control device configured to perform a first-image pickup operation a predetermined number of times, configured to perform the finder display, and configured to perform a second-image pickup operation for performing the focal-point detection every time the first-image pickup operation is performed the predetermined number of times,
wherein said control device changes the number of times the first-image pickup operation is performed according to a photographic mode of operation of said image pick-up apparatus.

3. An image-pickup apparatus comprising,
an image-pickup element configured to pick up images of a subject and to output first-image signals usable for performing finder display and second-image signals usable for performing focal-point detection; and
a control device configured to perform a first-image pickup operation a predetermined number of times, configured to perform the finder display, and configured to perform a second-image pickup operation for performing the focal-point detection every time the first-image pickup operation is performed the predetermined number of times,
wherein said control device changes the number of times the first-image pickup operation is performed according to a photographic mode of operation of said image pick-up apparatus corresponding to movement of the subject.

4. A control method applied to an image-pickup apparatus including an image-pickup element configured to pick up images of a subject and to output first-image signals usable for performing finder display and second-image signals usable for performing focal-point detection, the control method comprising the steps of:
performing a first-image pickup operation a predetermined number of times for performing the finder display; and
performing a second-image pickup operation for performing the focal-point detection every time the first-image pickup operation is performed the predetermined number of times,
wherein the finder display is not performed by using the second-image signal generated by the second-image pickup operation.

5. A control method applied to an image-pickup apparatus including an image-pickup element configured to pick up images of a subject and to output first-image signals usable for performing finder display and second-image signals usable for performing focal-point detection, the control method comprising the steps of:

performing a first-image pickup operation a predetermined number of times for performing the finder display; and performing a second-image pickup operation for performing the focal-point detection every time the first-image pickup operation is performed the predetermined number of times, wherein the number of times the first-image pickup operation is performed is changed according to a photographic mode of operation of the image pick-up apparatus.

6. A control method applied to an image-pickup apparatus including an image-pickup element configured to pick up images of a subject and to output first-image signals usable for performing finder display and second-image signals usable for performing focal-point detection, the control method comprising the steps of:

performing a first-image pickup operation a predetermined number of times for performing the finder display; and performing a second-image pickup operation for performing the focal-point detection every time the first-image pickup operation is performed the predetermined number of times, wherein the number of times the first-image pickup operation is performed is changed according to a photographic mode of operation of the image pick-up apparatus corresponding to movement of the subject.

7. A computer readable medium having encoded thereon an image focal-point detection program comprising a set of instructions when executed by a computer to implement a method for picking up images of a subject with an image pick-up element and outputting first-image signals usable for performing finder display and second-image signals usable for performing focal-point detection, the method comprising the steps of:

performing a first-image pickup operation a predetermined number of times for performing the finder display; and performing a second-image pickup operation for performing the focal-point detection every time the first-image pickup operation is performed the predetermined number of times, wherein the finder display is not performed by using the second-image signal generated by the second-image pickup operation.

8. A computer readable medium having encoded thereon an image focal-point detection program comprising a set of instructions when executed by a computer to implement a method for picking up images of a subject with an image pick-up element and outputting first-image signals usable for performing finder display and second-image signals usable for performing focal-point detection, the method comprising the steps of:

performing a first-image pickup operation a predetermined number of times for performing the finder display; and performing a second-image pickup operation for performing the focal-point detection every time the first-image pickup operation is performed the predetermined number of times, wherein the number of times the first-image pickup operation is performed is changed according to a photographic mode of the operation of the method.

9. A computer readable medium having encoded thereon an image focal-point detection program comprising a set of instructions when executed by a computer to implement a method for picking up images of a subject with an image pick-up element and outputting first-image signals usable for performing finder display and second-image signals usable for performing focal-point detection, the method comprising the steps of:

performing a first-image pickup operation a predetermined number of times for performing the finder display; and performing a second-image pickup operation for performing the focal-point detection every time the first-image pickup is performed the predetermined number of times, wherein the number of times the first-image pickup is performed is changed according to a photographic mode of operation of the method corresponding to movement of the subject.

* * * * *

UNITED STATES PATENT AND TRADEMARK OFFICE
CERTIFICATE OF CORRECTION

| | | |
|---|---|---|
| PATENT NO. | : 7,161,628 B2 | Page 1 of 1 |
| APPLICATION NO. | : 10/320477 | |
| DATED | : January 9, 2007 | |
| INVENTOR(S) | : Hideo Tamamura | |

It is certified that error appears in the above-identified patent and that said Letters Patent is hereby corrected as shown below:

IN THE DRAWINGS
SHEET 3

FIG. 3, "PREDERMINED" should read --PREDETERMINED--.

COLUMN 2

Line 21, "view" should read --schematic view--; and "digital" should read --digital camera--.

COLUMN 7

Line 2, "is" should read --are--.

Signed and Sealed this

Fifth Day of June, 2007

JON W. DUDAS
*Director of the United States Patent and Trademark Office*